Figure 1:
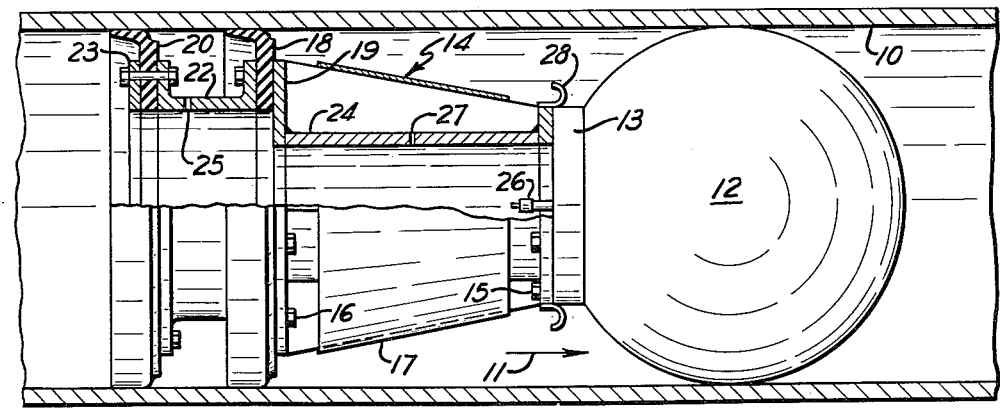

INVENTOR.
HOWARD J. EnDEAN
BY
ATTORNEY 3,074,436
PIPELINE BATCHING PIG
Howard J. En Dean, Houston, Tex., assignor to Gulf Research & Development Company, Pittsburgh, Pa., a corporation of Delaware
Filed Oct. 26, 1960, Ser. No. 65,185
2 Claims. (Cl. 137—262)

This invention relates to pipeline operation and in particular pertains to an improved device employed for mechanically separating two batches of fluid that are successively pumped through a pipeline.

In pipeline operation it is common practice to pump different fluids through the line in succession. In order to minimize commingling of the fluids at the interface between them it is common to employ a device called a batching pig. The purpose of the batching pig is to form a mechanical barrier between the two successive fluids to prevent or at least materially reduce commingling of the fluids. It is desirable that the batching pig form a sliding seal against the pipe wall so that substantially no fluid will by-pass the batching pig as it is carried along by the flowing fluid.

Difficulty is experienced in providing a batching pig that maintains the seal against the pipe wall at all parts of the pipeline. The heretofore used types of devices tend to lose the seal at certain fittings usually found in a pipeline. At bends in the line the bend may so deform an elongate separator that the seal is broken and some degree of by-passing may occur. At joints such T's or Y's, the inside diameter of the fitting may differ from that of the pipeline proper so that by-passing may occur. Pipelines also commonly have a large number of valves since these are required for performing the necessary switching operations. Check valves which are present in the pipeline to prevent reverse flow are particularly difficult for the heretofore known types of batching pigs to traverse satisfactorily. In particular, any variation in the normal internal diameter of the pipeline presents a problem in the operation of a batching pig in that places of reduced diameter cause the device to stick, whereas places of non-circular section or of enlarged diameter allow the fluid to by-pass the batching pig for the time required for the device to traverse the anomalous section. In the event that the sealing elements of the pig have become worn so that their diameter is smaller than normal, even a nominal enlargement in the pipeline will allow a substantial degree of by-passing and in severe cases the device may even lose its propelling effort so that it will lodge in the enlargement and cease to perform its intended function.

It is the purpose of this invention to provide an improved fluid separator or batching pig for use in a pipeline that avoids the above-mentioned difficulties.

It is a further object of this invention to provide a pipeline batching pig that has improved sealing properties in that it maintains its seal while traversing enlargements which it traverses more quickly than heretofore known devices and without danger of lodgment, and that is capable of traversing bends, valves, and constrictions with reduced danger of sticking.

Figure 2:
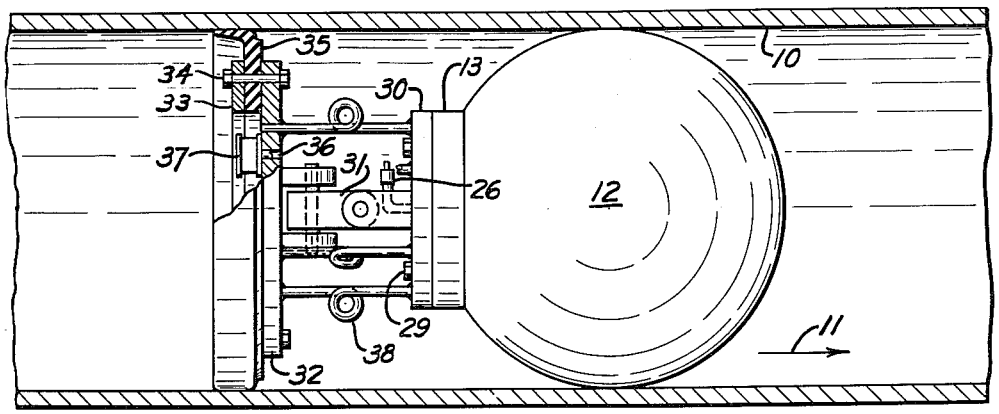
Figure 3:
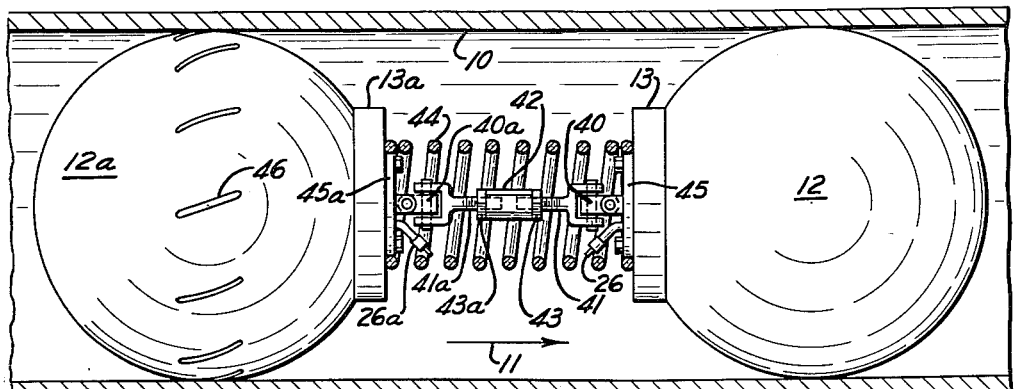

These and other objects of this invention are accomplished by the herein described apparatus, reference being made to the accompanying figures in which FIGURE 1 shows one embodiment of my invention in which a spheroidal sealing member and a cup-shaped sealing member are rigidly connected;

FIGURE 2 shows an embodiment of this invention in which a spheroidal sealing member and a cup-shaped sealing member are connected by a universal coupling with resilient means to maintain axial alignment; and FIGURE 3 shows an embodiment of this invention in which two spheroidal sealing members are each connected to an interposed shaft by means of universal couplings and having a spring to resiliently provide axial alignment.

The heretofore commonly used types of batching pigs generally have two or more elastic cups or discs mounted on the device, the cups having turned back lips that seal against the pipe wall in the manner of the well-known pump cup or washer. These have the disadvantage that the seal is broken as the cup traverses an irregularity, and they also wear rapidly with resulting loss of seal. More recently a type of elastic ball or sphere has been employed as a pipeline fluid separator, the sphere being made of elastic material, either solid or hollow, and in the latter case the sphere is filled with liquid. The sphere if solid is usually somewhat larger in undeformed outside diameter than the inside diameter of the pipe, so that upon insertion in the pipe the device is elastically deformed and takes on the shape of a prolate spheroid which seals against the pipeline wall. In the case of a hollow sphere, the empty sphere is usually somewhat smaller in undeformed outside diameter than the nominal inside diameter of the pipe in which it is to be used, and the sphere is filled with liquid (usually water) under pressure thereby to expand the filled sphere to an outside diameter that is slightly larger than the inside diameter of the pipe, so that upon insertion in the pipe the device is elastically deformed and takes on the shape of a prolate spheroid which seals against the pipeline wall. While the sphere type of device has better sealing and wearing qualities than the disc or cup type device, the sphere is much more expensive and is also more prone to lodge or hang up.

The batching pig of this invention retains the desirable qualities of both the sphere type and the cup type device and in particular employs the advantageous qualities of each type to compensate the shortcomings of the other.

The batching pig of this invention comprises two sealing elements, at least one of which is spheroidal in shape, and which sealing elements are mechanically connected so as to traverse the pipeline in tandem with the spheroidal element forward. The rearward sealing element is provided with a fluid by-pass channel of restricted flow capacity. The rearward sealing element is preferably cup-shaped, but alternatively may be disc-shaped or spheroidal in shape.

Referring to FIGURE 1, there is shown the pipe 10 forming the normal pipeline conduit with the direction of fluid flow indicated by the arrow 11. The batching pig of this invention employs at least two sealing elements, the leading one 12 being prolate spheroidal in shape. The spheroidal element 12 may be solid or hollow as such elements are generally made, and if hollow, the element is filled and sized with liquid as is customary. The element 12 is made of oil-resistant elastomer such as synthetic rubber and is compounded so as to have optimum wearing qualities as is well known in the art. Inasmuch as the spheroidal element 12 has other elements attached thereto, it is preferred to bond onto or mold into the material of the spheroid a metal base plate 13 provided with tapped screw holes so that the base plate 13 may serve as a convenient means for fastening other elements to the spheroid 12.

A valve stem 26 is provided to form a connection to the interior of spheroid 12, the valve stem being conveniently mounted on the base 13 of the spheroid. A conventional check valve (not shown) is provided in the valve stem 26 so that the spheroid may be filled and sized by the injection of liquid through the valve stem 26. After filling and sizing the spheroid, the valve is sealed by a conventional valve cap. Proper sizing of the spheroid 12 is such that about ⅛-inch of flattened cylindrical contact is made for each inch of nominal pipeline diameter. Thus for example a spheroid for use in an 8-inch diameter pipeline is sized so that about 1-inch axial length cylindrical contact is made with the inside surface of the pipe.

The spheroid 12 is attached to a frame 14 which in this invention may take any of a variety of forms. In the embodiment illustrated in FIGURE 1, the frame 14 comprises a rigid hollow cylinder 24 made of metal, such as aluminum. The cylinder 24 is provided at the front end with an annular flange welded to the cylinder, and the flange is drilled for bolts 15. At the rear end of cylinder 24 is welded a rear flange 19 that is drilled for bolts 16. Longitudinal ribs may be welded between the end flanges to add strength to the assembly. The bolts 15 unite the forward flange of the frame 14 with the base 13 of the spheroid. The frame 14 may be provided with a shroud 17 if desired.

The rearward flange 19 of the frame 14 connects to one or more scraper cups 18 and 20. These are well known devices made of rubber or other elastomer having an annular backward turning lip that seals against the pipe wall. The scraper cup 18 is fastened to the frame 14 by means of bolts 16. If desired, more than one scraper cup may be employed at the rearward end of the assembly and the respective cups are joined by means of an annular rigid coupling member 22. An annular end plate 23 serves to clamp the rearmost scraper cup 20 in place on the coupling member 22. Alternatively, instead of using one or more scraper cups as the rearward sealing element, a second spheroid may be employed. It is preferred to use scraper cups as the rearward sealing element because they are more economical and the rearward sealing element is employed primarily as an auxiliary propelling means whereas the seal is primarily effected by the forward spheroidal sealing element 12.

The axial length of the frame 14 depends on the radius of curvature of minimum bends in the pipeline and the length of enlarged regions such as are found in valves to be traversed. The frame 14 is made long enough so that the sealing elements 12 and 18 will span or straddle an enlarged region of the pipeline such as the body of a check valve, whereby while one sealing element is in the enlarged region the other sealing element maintains a seal in the adjoining normal pipe. However the length of the frame 14 should not be made excessively long because this prevents the assembly from easily negotiating sharp bends in the pipeline.

The frame 14 forms a bar or partition that serves to separate the pipeline space behind the rearward sealing element from the pipeline space intermediate between the forward and the rearward sealing elements. An important feature of this invention is that a flow by-pass of restricted flow capacity is provided around the rearward sealing member or members. This comprises one or more small bleed holes 27 that are drilled in the cylinder 24 of frame 14. For example, in a batching pig of the type shown in FIGURE 1 for use in a 24-inch pipeline the holes 27 may be four in number and be about ¼-inch in diameter. The holes 27 form a flow channel of restricted flow capacity that will allow access of the pipeline pressure from behind the rearmost scraper 20 to the pipeline space immediately behind the forward spheroid 12, but permitting only a small amount of fluid flow as compared to the pipeline capacity. The coupling member 22 is also provided with one or more small holes 25 so as to provide access of the pipeline pressure to the space between the individual members 18 and 20 of the rearward sealing member.

The device of FIGURE 1 is launched in the pipeline by means of a conventional scraper trap and recovered by similar means. A plurality of grapple hooks 28 are welded to the forward flange of frame 14 to provide means to facilitate handling of the assembly. The assembly is inserted with the spheroid 12 leading. The rear scraper cups 18 and 20 provide supplementary propulsion in traversing pipeline conditions which cannot be satisfactorily negotiated by a spheroid alone, such conditions being illustrated by T's, check valves, etc. The device is particularly advantageous in that it provides the excellent sealing qualities of the spheroid and it eliminates the undesirable tendency of the spheroid to hang up in enlargements in the pipeline because the scrapers push the spheroid on through any anomalous pipeline condition into the normal section of pipe. A further advantage of the invention is that at T connections where the side conduit carries substantial flow an isolated spheroid may actually stick to and seal off the side opening, whereas the device of this invention pushes the spheroid beyond the side opening so that the separator can continue its traverse through the pipeline.

FIGURE 2 shows an embodiment of this invention in which a spheroid 12 and a scraper cup 35 are connected by an articulated connection in the form of a universal joint. The forward spheroid 12 is fastened by means of its base 13 to a flange 30 of a universal joint 31 by means of bolts 29. The flange 30 carries one fork of the universal joint and the other fork is carried by a plate 32. By means of an annular clamping plate 33 and bolts 34 the scraper cup 35 is clamped to the plate 32. The spheroid 12 is sized as previously explained through the valve and valve stem 26. A small opening 36 through the center of plate 32 provides by-pass around the scraper cup 35. In order to restrict flow through the opening 36 a flow control device 37 may be provided, the control device 37 having an automatic choke that allows only restricted flow therethrough. In this manner the pipeline space intermediate the two sealing elements 12 and 35 is subjected to the same pressure as that behind the cup 35 but only a restricted flow of fluid may by-pass the cup 35.

In order to maintain the spheroid 12 and the scraper cup 35 in axial alignment a plurality of single-turn springs 38 are provided. The springs 38 are preferably three or more in number, and are substantially equally spaced around the axis of the device of FIGURE 2. The ends of the springs 38 are tightly fastened in the plates 30 and 32 as by inserting the end of the spring in a hole in the plate and welding the spring in place. It is apparent that the axes of the spheroid 12 and of the scraper cup 35 are resiliently held in alignment by the springs 38, but should a condition be encountered in the pipeline such that the condition is more easily traversed by bending of the assembly the latter can do so by action of the universal joint 31. At the same time the universal joint 31 and springs 38 maintain substantially constant longitudinal spacing between the sealing members 12 and 35. The embodiment of FIGURE 2 also has the advantages of providing the efficient sealing properties of the spheroid 12 as well as the supplemental propelling effect of the scraper cup 35 thereby avoiding possibility of the spheroid lodging in enlargements or at T's in the pipeline.

FIGURE 3 shows an embodiment of the invention employing two spheroidal sealing members 12 and 12a. Each spheroid is sized as previously explained through valves and valve stems 26 and 26a respectively. Each spheroid has a base 13 and 13a to which is bolted a base 45 and 45a each of which carries one side of a universal joint coupling 40 and 40a. The two universal joints 40 and 40a are connected by a shaft made up of two end arms 41 and 41a to which the respective universal joints are connected. The juxtaposed ends of the arms 41 and 41a have right-hand left-hand threads respectively, which threads are engaged by turnbuckle nut 42. Each arm may be locked to the turnbuckle by means of a lock nut 43 and 43a. A spiral spring 44 under substantial compression is placed around two universal joints and their interconnecting shaft. The spring 44 is held centered by the bases 45 and 45a of the universal joints. The spring 44 tends to push the two spheroids 12 and 12a apart, but they are maintained at a fixed separation by the shaft connecting the universal joints 40 and 40a. Thus the spring 44 resiliently maintains axial alignment of the spheroids 12 and 12a, but the alignment will give way momentarily if necessary in order for the assembly to negotiate special conditions in the pipeline.

The embodiment of FIGURE 3 has the advantage that it is reversible in direction. However, it is preferred that the rearward spheroid, namely 12a in FIGURE 3 have a by-pass channel as has the rear sealing element of FIGURES 1 and 2. For this purpose the rearward spheroid may at the contact between the spheroid and the pipe be provided with one or more spiral grooves 46 which allow the pressure behind the assembly of FIGURE 3 restricted access to the space intermediate the spheroids 12 and 12a. Alternatively a small conduit may be provided through the rearward spheroid 12a in order to provide a restricted flow channel similar to that shown in FIGURES 1 and 2.

The embodiment of FIGURE 2, being short in the direction of motion of the assembly is advantageous for use in pipelines having many sharp bends or turns. On the other hand the embodiment of FIGURE 3 can be made as long as desired by simply lengthening the rod which interconnects the two spheroids. The embodiment of FIGURE 3 has the advantage of retaining the superior sealing quality of the spheroid for both sealing members. The embodiment of FIGURE 1 is preferred for the average pipeline. The embodiment of FIGURE 1 is capable of traversing most bends, valves, T's, etc. without danger of sticking or lodging. Even though the spheroid 12 should tend to either stick or lodge, the propelling effect of the scraper cups will furnish the effort to move the assembly along.

The by-pass channel around the rearward sealing member serves two purposes. It provides a reduced pressure differential across the rearward sealing element, thereby substantially reducing the wear on this element. As the pressure across the rearward scraper is reduced, the force which the lip of the scraper cup exerts against the pipe wall is reduced and this results in reduced wear. Also by providing a by-pass across the rear sealing member the pressure behind the forward sealing member may momentarily build up to a high value whenever the forward sealing member becomes stuck so that maximum effect is brought to bear to dislodge the stuck member. On the other hand, if the forward spheroid should lose its propelling effort due to blow-by of fluid in an enlarged section of the pipeline, the restricted by-pass of the rearward sealing element will permit a substantial differential pressure to build up across the rearward sealing element, with the result that the rearward sealing element provides the necessary propelling effort to push the assembly on into the normal part of the pipeline.

What I claim as my invention is:

1. A batching pig for a pipeline comprising at least two sealing members adapted to form sliding seals against the interior wall of the pipeline when inserted therein, means connecting said sealing members including at least one universal joint, resilient means cooperating with said connecting means urging said sealing members into coaxial alignment, at least one of said sealing members being spheroidal in shape with its axis of revolution parallel to the axis joining said sealing members, and restricted flow-carrying means providing a hydraulic by-pass for the rearward terminal sealing member.

2. A batching pig for a pipeline comprising at least two sealing members adapted to form sliding seals against the interior wall of the pipeline when inserted therein, said sealing members being spheroidal in shape with its axis of revolution parallel to the axis of the pipeline, a universal joint connected to each of said sealing members, a shaft interconnecting said universal joints, a spiral spring compressed between said sealing members situated outside said shaft and universal joints, and a restricted flow channel in the rearward terminal sealing member providing access of pipeline pressure to the space intermediate said sealing members.

References Cited in the file of this patent

UNITED STATES PATENTS

| | | |
|---|---|---|
| 971,042 | Hill et al. | Sept. 27, 1910 |
| 1,966,819 | Irvin | July 17, 1934 |
| 2,601,614 | Johnson | June 24, 1952 |
| 2,796,878 | Atkinson et al. | June 25, 1957 |
| 2,810,143 | Reynolds | Oct. 22, 1957 |
| 2,951,362 | En Dean et al. | Sept. 6, 1960 |
| 3,025,118 | Ver Nooy | Mar. 13, 1962 |